(12) United States Patent
Fujita

(10) Patent No.: US 10,352,445 B2
(45) Date of Patent: Jul. 16, 2019

(54) PISTON RING

(71) Applicant: KABUSHIKI KAISHA RIKEN, Chiyoda-ku, Tokyo (JP)

(72) Inventor: Masaaki Fujita, Kashiwazaki (JP)

(73) Assignee: KABUSHIKI KAISHA RIKEN, Chiyoda-ku, Tokyo (JP)

( * ) Notice: Subject to any disclaimer, the term of this patent is extended or adjusted under 35 U.S.C. 154(b) by 0 days.

(21) Appl. No.: 16/079,556

(22) PCT Filed: Feb. 21, 2017

(86) PCT No.: PCT/JP2017/006379
§ 371 (c)(1),
(2) Date: Aug. 23, 2018

(87) PCT Pub. No.: WO2017/146048
PCT Pub. Date: Aug. 31, 2017

(65) Prior Publication Data
US 2019/0049010 A1    Feb. 14, 2019

(30) Foreign Application Priority Data

Feb. 26, 2016    (JP) ................. 2016-035276

(51) Int. Cl.
*F16J 9/20* (2006.01)
*F02F 5/00* (2006.01)
*F16J 9/26* (2006.01)

(52) U.S. Cl.
CPC ................. *F16J 9/20* (2013.01); *F02F 5/00* (2013.01); *F16J 9/26* (2013.01)

(58) Field of Classification Search
CPC .............. F16J 9/20; F16J 9/26; F02F 5/00
(Continued)

(56) References Cited

U.S. PATENT DOCUMENTS

| 2,459,395 A | * | 1/1949 | Smith | F16J 9/20 277/453 |
| 5,779,243 A | * | 7/1998 | Hanlon | F16J 9/26 277/434 |
| 6,470,792 B1 | * | 10/2002 | Michel | F16J 9/20 92/208 |

(Continued)

FOREIGN PATENT DOCUMENTS

| CN | 101403348 | 4/2009 |
| CN | 202325888 | 7/2012 |

(Continued)

OTHER PUBLICATIONS

International Preliminary Report on Patentability with Written Opinion dated Sep. 7, 2018 for PCT/JP2017/006379.
International Search Report dated May 16, 2017 for PCT/JP2017/006379.

*Primary Examiner* — Nathan Cumar
(74) *Attorney, Agent, or Firm* — SOEI Patent & Law Firm (57) ABSTRACT

A piston ring includes an annular body having: an inner circumferential surface and an outer circumferential surface; one side surface and the other side surface substantially orthogonal to the inner circumferential surface; and a pair of joint ends. The outer circumferential surface includes an inclined surface and an abutment surface. In a direction connecting the one side surface and the other side surface, a maximum width W1 of the abutment surface at the joint end is 80% to 150% of a maximum width W2 of the abutment surface in a portion other than the joint end. In the body, a two-axis difference (d2−d1) between a diameter d1 in a first axis direction passing through a central position of the joint and a diameter d2 in a second axis direction orthogonal to the first axis direction is greater than −0.25 mm and less than +0.36 mm.

20 Claims, 7 Drawing Sheets

(58) Field of Classification Search
USPC .......................................................... 277/443
See application file for complete search history.

(56) References Cited

U.S. PATENT DOCUMENTS

| | | | | |
|---|---|---|---|---|
| 2002/0175476 A1* | 11/2002 | Chinou | ............... | F16J 9/26 |
| | | | | 277/440 |
| 2006/0269790 A1* | 11/2006 | Sarabanda | ............ | C23C 14/025 |
| | | | | 428/698 |
| 2013/0328274 A1* | 12/2013 | Sugiura | ............... | F16J 9/20 |
| | | | | 277/444 |

FOREIGN PATENT DOCUMENTS

| | | |
|---|---|---|
| CN | 104520615 | 4/2015 |
| DE | 102004021361 | 5/2005 |
| JP | S56-015437 | 7/1979 |
| JP | S62-018775 | 5/1987 |
| JP | S63-006270 | 1/1988 |
| JP | H1-224569 | 9/1989 |
| JP | 2002-054499 | 2/2002 |
| JP | 2011-169388 | 9/2011 |
| JP | 2011-214662 | 10/2011 |
| WO | 2012/118036 | 9/2012 |

* cited by examiner

PISTON RING

CROSS-REFERENCE TO RELATED APPLICATIONS

This application is a U.S. National Phase patent application of PCT Application No. PCT/JP2017/006379, filed Feb. 21, 2017 which claims the benefit of priority from Japanese Patent Application No. 2016-035276, filed Feb. 26, 2016.

TECHNICAL FIELD

The present invention relates to a piston ring used in an internal combustion engine or the like.

BACKGROUND ART

A piston ring used in an internal combustion engine of an automobile or the like is provided in, for example, a ring groove of an outer circumferential surface of a piston and has a sealing function of inhibiting oil on an inner wall of a cylinder from entering a combustion chamber side from a crankcase side (oil-up) and inhibiting blow-by gas from entering the crankcase side from the combustion chamber side. As a piston ring having such a sealing function, there is a piston ring disclosed in, for example, Patent Literature 1. The conventional piston ring is used as a second ring of an internal combustion engine, and has an inclined surface provided on an upper surface side of an outer circumferential surface and inclined so as to protrude in a radial direction, and an abutment surface provided from a lower end of the inclined surface and coming in sliding contact with a cylinder inner wall.

In addition, in a piston ring disclosed in Patent Literature 2, a thickness of a portion of a body positioned on an opposite side of a joint section is greater than the other portions. The piston ring has a shape close to an ellipse in a state (force-free state) in which a force is not applied in an in-plane direction of the body. In Patent Literature 2, in a state in which the body is placed on a table and a joint gap is closed to a dimension at the time of use, a two-axis difference (d2−d1) between a diameter d1 in a first axis direction passing through a central position of the joint section and a diameter d2 in a second axis direction orthogonal to the first axis direction is negative.

CITATION LIST

Patent Literature

Patent Literature 1: Japanese Unexamined Patent Publication No. 2011-169388
Patent Literature 2: Japanese Unexamined Utility Model Publication No. S56-15437

SUMMARY OF INVENTION

Technical Problem

For forming the abutment surface of the piston ring, for example, an outer circumferential lapping process using the self tension of the ring is adopted. The outer circumferential lapping process is performed in the final step of manufacturing the piston ring. The outer circumferential lapping process is a processing method of forming the abutment surface along the outer circumferential surface of the piston ring by mounting the piston ring on a cylinder having the same diameter as the actually mounted cylinder and performing lapping in a sleeve having the same inner diameter as the outer diameter (nominal diameter) of the piston ring. However, when the abutment surface is formed by the outer circumferential lapping process, the processing amount of the joint end tends to increase more than the processing amount of the other portions because the joint end that is the free end protrudes to the sleeve side. This tendency strongly appears as the two-axis difference of the piston ring increases toward the plus side. The machining accuracy of the abutment surface directly leads to problems such as an increase in oil consumption due to a reduction in surface pressure against the inner wall of the cylinder and an increase in frictional loss due to progressive wear, and thus the improvement thereof is required.

In order to guarantee the machining accuracy of the outer circumferential lapping process, it is considered that the two-axis difference of the piston ring is set to be minus, as disclosed in Patent Literature 2. If the two-axis difference of the piston ring is set to negative, the problem of the effects of wear of the joint end is suppressed, however the sealing function of the piston ring may not be fully provided. In the top ring, gas pressure at the time of combustion goes around from the upper side surface of the piston ring into the ring groove and creates back pressure from the inner circumferential surface side. Due to the back pressure, the outer circumferential surface of the piston ring is pressed against the cylinder inner wall, thereby ensuring the sealability of the piston ring. In contrast, in the second ring, since the back pressure is smaller than that in the top ring, the sealability by the outer circumferential surface of the piston ring will be influenced by the surface pressure distribution of the piston ring.

It is an object of one aspect of the present invention to provide a piston ring that can sufficiently provide the sealability by an outer circumferential surface, and can reduce an increase in oil consumption due to the reduction of surface pressure and an increase in frictional loss due to the effects of wear.

Solution to Problem

A piston ring according to one aspect of the present invention comprises an annular body including: an inner circumferential surface and an outer circumferential surface; one side surface and the other side surface substantially orthogonal to the inner circumferential surface; and a pair of joint ends opposite to each other to form a joint section, wherein the outer circumferential surface includes: an inclined surface inclined so as to protrude in a radial direction of the body from the one side surface side to the other side surface side; and an abutment surface provided on the other side surface side of the inclined surface and extending substantially parallel to the inner circumferential surface, in a direction connecting the one side surface and the other side surface, a maximum width W1 of the abutment surface at the joint end is 80% to 150% of a maximum width W2 of the abutment surface in a portion other than the joint end, and in the body, a two-axis difference (d2−d1) between a diameter d1 in a first axis direction passing through a central position of the joint section and a diameter d2 in a second axis direction orthogonal to the first axis direction is greater than −0.25 mm and less than +0.36 mm.

In the piston ring, the maximum width W1 of the abutment surface of the joint end is less than or equal to 150% of the maximum width W2 of the abutment surface in the portion other than the joint end. When this range is satisfied, the variation in the width of the abutment surface in accordance with the portion of the body is suppressed. Therefore, it is possible to suppress an increase in oil consumption due to the reduction in surface pressure and an increase in frictional loss due to the effects of wear. In addition, in the piston ring, the two-axis difference (d2−d1) is less than +0.36 mm. Therefore, in the outer circumferential lapping process, the joint ends are restricted from protruding toward the sleeve side by self tension, which enables the machining accuracy of the abutment surface to be sufficient. Thus, the abutment surface satisfying the above range can be formed with high yield. Furthermore, in the piston ring, the two-axis difference (d2−d1) is greater than −0.25 mm. Therefore, even when the back pressure is small, it is possible to sufficiently provide the sealability by the outer circumferential surface.

A hard film having a hardness higher than that of the body may extend in a circumferential direction of the body as an outermost surface of the outer circumferential surface. The effects of wear of the abutment surface can be suppressed by using the hard film. In addition, in the outer circumferential lapping process, the difference between the maximum width W1 of the abutment surface at the joint end and the maximum width W2 of the abutment surface in the portion other than the joint end can be reduced, and the abutment surface satisfying the above range can be formed with even better yield.

The hard film may be a physical vapor deposition film. In this case, the hard film can be formed with sufficient hardness.

The hard film may include at least one film selected from the group consisting of a titanium nitride film, a chromium nitride film, a titanium carbonitride film, a chromium carbonitride film, a chromium oxynitride film, a chromium film, a titanium film, and a diamond-like carbon film. In this case, the hard film can be formed with sufficient hardness.

A thickness of the hard film may be 1 μm to 30 μm. In this case, the thickness of the hard film becomes sufficient and the effects of wear of the abutment surface can be suppressed.

When the central position of the joint section is set to be 0° and the position of the body is represented by an angle, the abutment surface at one of the joint ends may be a portion positioned in a range of 0° to 15°, the abutment surface at the other of the joint ends may be a portion positioned in a range of 345° to 360°, and the abutment surface in a portion other than the joint ends may be a portion positioned in a range greater than 15° and less than 345°. When the joint ends are positioned in the above range and the relationship of the maximum width of the abutment surface is satisfied, it is possible to effectively suppress an increase in oil consumption due to the reduction in surface pressure and an increase in frictional loss due to the effects of wear.

The maximum width W1 is 80% to 150% of the maximum width of the abutment surface in the range of 150° to 210° in the portion other than the joint ends. When the maximum width W1 satisfies the above range with respect to the maximum width of the range where the width tends to become smallest in the abutment surface in the portion other than the joint ends, the variation in the width of the abutment surface by the portion of the body is more preferably suppressed.

The maximum width W2 may be 1% to 50% of a width of the body. When this range is satisfied, an oil film can be suitably formed on the inner wall of the cylinder, and scraping up of the oil into the combustion chamber by the abutment surface can be suppressed. In addition, an increase in the frictional loss due to the abutment surface can be avoided.

The maximum width W2 may be 0.005 mm to 0.5 mm. When this range is satisfied, it is possible to suppress the initial frictional loss due to the piston ring.

In the body, a notch portion may extend in the circumferential direction of the body at a corner portion formed by the other side surface and the outer circumferential surface. In this case, the oil scraped off by the piston ring can flow into the notch portion.

The piston ring may be a second ring. By using the piston ring as the second ring, it is possible to sufficiently provide the sealability by the outer circumferential surface even when the back pressure is small.

Advantageous Effects of Invention

According to one aspect of the present invention, it is possible to sufficiently provide the sealability by an outer circumferential surface and to reduce an increase in oil consumption due to the reduction of surface pressure and an increase in frictional loss due to the effects of wear.

DESCRIPTION OF EMBODIMENTS

Hereinafter, preferred embodiments of one aspect of the present invention will be described in detail with reference to the accompanying drawings. In the following description, the same reference numerals will be used for the same elements or elements having the same function, and a redundant description thereof will be omitted.

Figure 1:
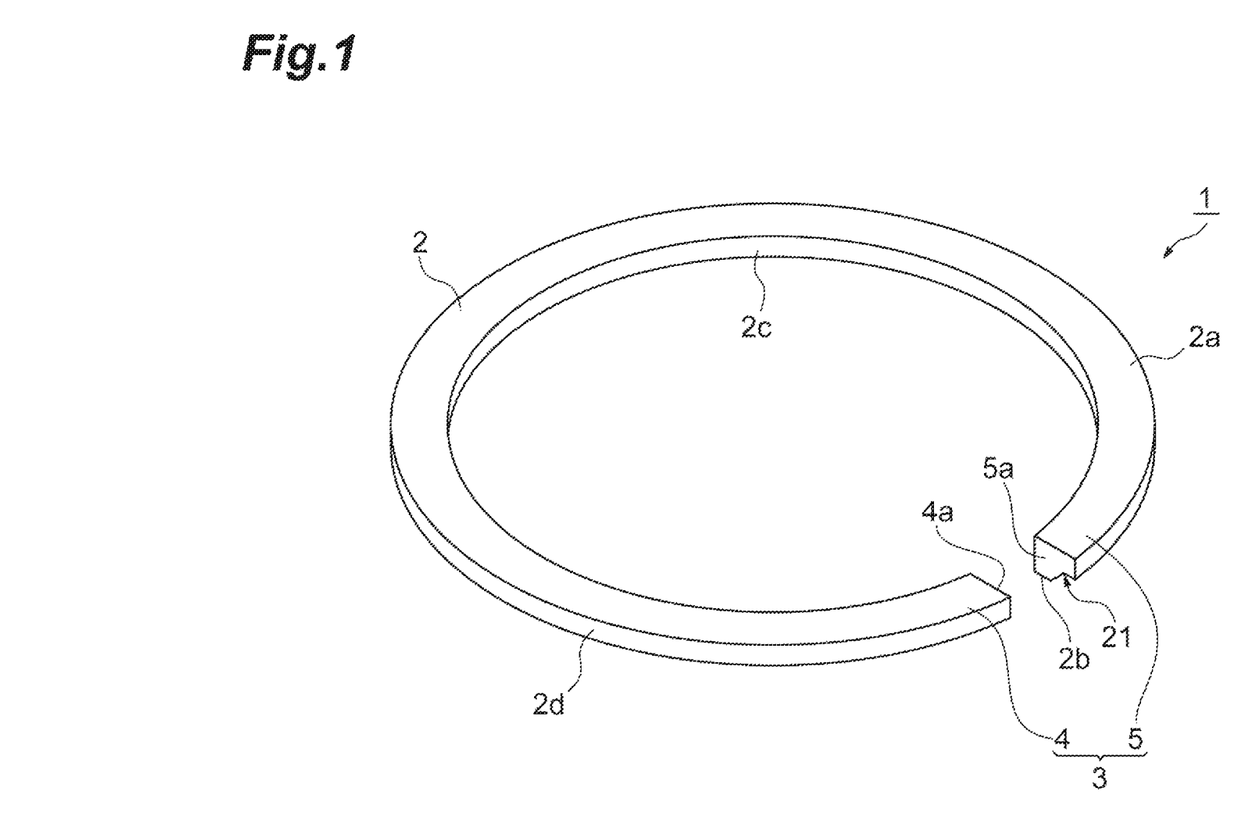
FIG. 1 is a perspective view of a piston ring according to an embodiment.
Figure 2:
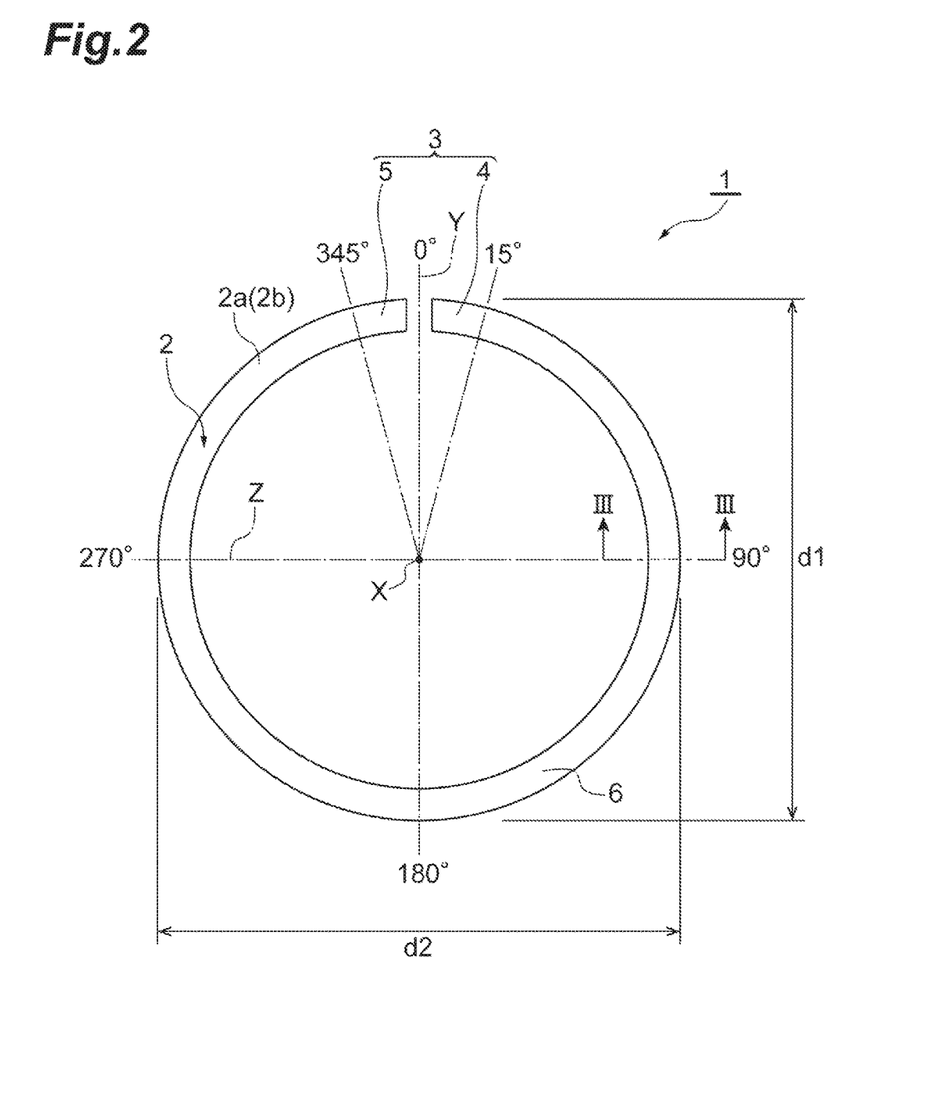
FIG. 2 is a plan view illustrating the piston ring according to the embodiment in a state of being mounted on a cylinder.

FIG. 1 is a perspective view of a piston ring according to the present embodiment. In addition, FIG. 2 is a plan view illustrating the piston ring according to the present embodiment in a state of being mounted on a cylinder. The piston ring 1 illustrated in FIGS. 1 and 2 is used as, for example, a second ring provided in a ring groove of an outer circumferential surface in an internal combustion engine of an automobile. The piston ring 1 slides on an inner wall of the cylinder and provides a function of inhibiting oil on the inner wall of the cylinder from entering a combustion chamber side from a crankcase side (oil-up) and inhibiting blow-by gas from entering the crankcase side from the combustion chamber side The piston ring 1 includes an annular body 2 and a joint section 3 formed in a portion of the body 2. The body 2 has a side surface (one side surface) 2a, a side surface (the other side surface) 2b, an inner circumferential surface 2c, and an outer circumferential surface 2d. In the following description, it is assumed that a direction connecting the side surface 2a and the side surface 2b is a width direction of the piston ring 1, and a direction connecting the inner circumferential surface 2c and the outer circumferential surface 2d is a thickness direction of the piston ring 1.

The body 2 has a substantially rectangular cross-section in which the thickness direction is the long side and the width direction is the short side. The width of the body 2 is, for example, 0.5 mm to 4.0 mm, and the thickness of the body 2 is, for example, 1.7 mm to 5.0 mm. In addition, the outer diameter (nominal diameter) of the body 2 is, for example, 50 mm to 150 mm. Each dimension of the body 2 can be measured by using a contact type or non-contact type shape measurement device (including a surface roughness measurement device). The body 2 is formed to have sufficient strength, heat resistance, and elasticity by using, for example, cast iron or steel containing a plurality of metal elements. Surface modification may be performed on the surface of the body 2 by, for example, a hard chromium plating layer, a chromium nitride layer, an iron nitride layer, or the like. It is possible to improve the wear resistance of the body 2 with respect to the ring groove of the piston by forming such a surface modified layer at least on the side surface 2b.

The two-axis difference of the body 2 is greater than −0.25 mm and less than +0.36 mm. As illustrated in FIG. 2, the two-axis difference is a difference (d2−d1) between a diameter d1 of the body 2 in the direction (first axis direction) along the first axis Y passing through the center X of the piston ring 1 and the center position of the joint section 3 in a plan view and a diameter d2 of the body 2 in the direction (second axis direction) along the second axis Z orthogonal to the first axis direction and passing through the center X of the piston ring 1 in a plan view. In the present embodiment, the diameter d2 is a value corresponding to the nominal diameter of the piston ring 1. The two-axis difference (d2−d1) of the body 2 may be greater than or equal to −0.23 mm or less than or equal to +0.31 mm.

The joint section 3 is a portion where a part of the body 2 is divided, and is formed by a pair of joint ends 4 and 5 facing each other. The pair of joint ends 4 and 5 are portions that are each free ends of the body 2. The gap (joint gap) of the joint section 3 can become narrowed, for example, when the piston ring 1 is heated and thermally expanded. That is, when the piston ring 1 is used, the joint section 3 functions as a relief section of the thermal expansion of the body 2 due to a temperature difference between the piston ring 1 and the cylinder.

Figure 3:
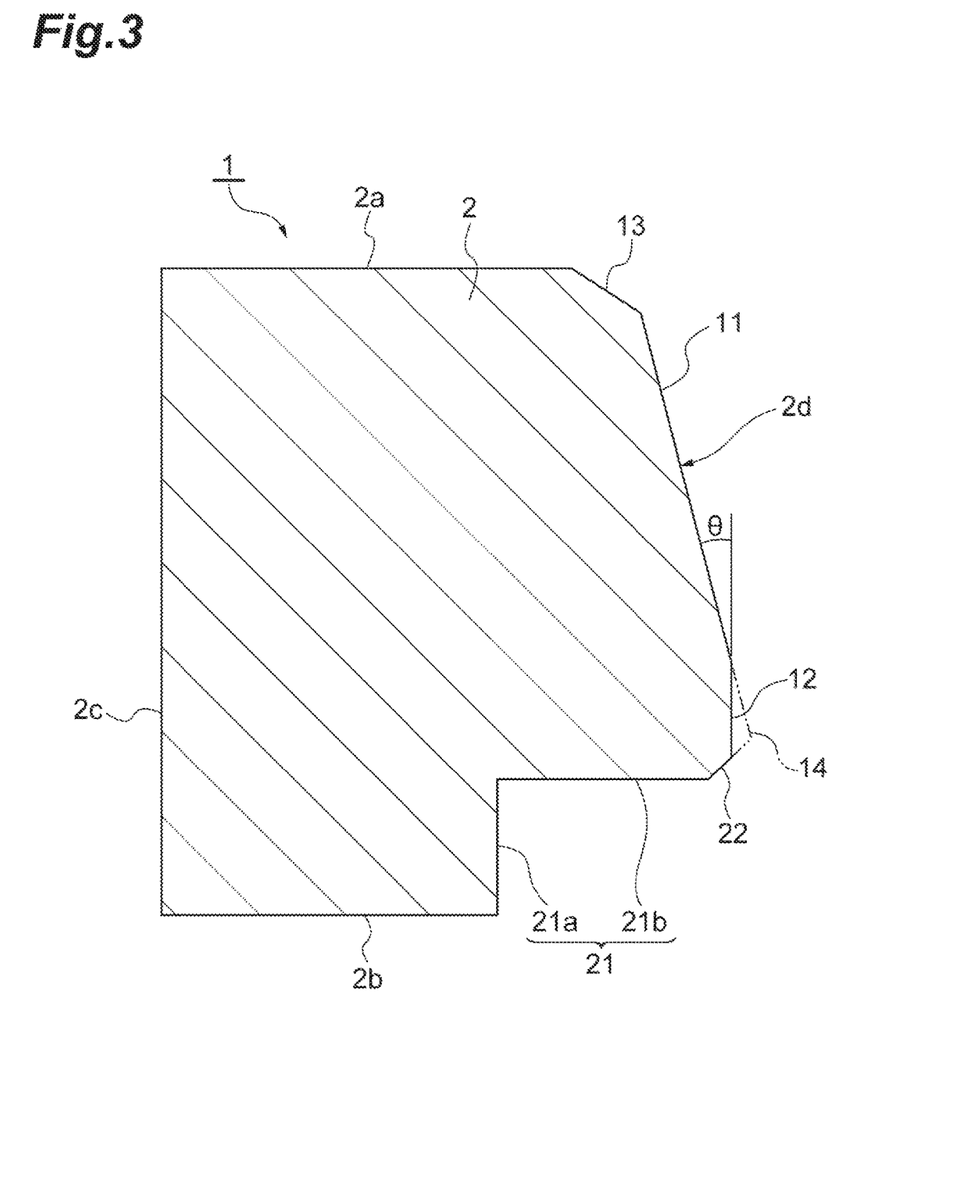
FIG. 3 is a cross-sectional view taken along line III-III in FIG. 2.

Next, the outer circumferential surface 2d of the body 2 will be described in more detail. FIG. 3 is a cross-sectional view taken along line III-III in FIG. 2.

As illustrated in FIG. 3, an inclined surface 11, an abutment surface 12, a connection surface 13, and a notch portion 21 are provided in the outer circumferential surface 2d. The inclined surface 11 is inclined so as to protrude in the radial direction of the body 2 from the side surface 2a toward the side surface 2b. The inclined surface 11 extends over the entire circumferential direction of the body 2. An inclined angle θ of the inclined surface 11 is, for example, 3° 30' or less. A width of the inclined surface 11 is, for example, 50% or more of the width of the body 2. Due to the formation of the inclined surface 11, the body 2 has a so-called tapered face shape. Therefore, when the piston ring 1 is mounted on the ring groove of the piston, only the side surface 2b side of the outer circumferential surface 2d slides on the cylinder inner wall. Therefore, since the area where the piston ring 1 contacts the inner wall of the cylinder is reduced, the friction with the inner wall of the cylinder can be reduced and the oil can be satisfactorily scraped off.

The connection surface 13 is a portion in which a corner portion formed by the side surface 2a and the outer circumferential surface 2d is chamfered, and is a surface connecting the inclined surface 11 and the side surface 2a. The connection surface 13 extends along the circumferential direction of the body 2 together with the inclined surface 11. The connection surface 13 is inclined so as to protrude in the radial direction of the body 2 from the side surface 2a toward the side surface 2b at an inclined angle greater than the inclined surface 11. The connection surface 13 may have a rounded shape. The abutment surface 12 is the surface on the outer circumferential surface 2d that protrudes the most in the radial direction. The abutment surface 12 slides in contact with the inner wall of the cylinder when the piston ring 1 is mounted on the ring groove of the piston. The abutment surface 12 extends over the entire circumferential direction of the body 2. The abutment surface 12 is substantially orthogonal to the side surfaces 2a and 2b and is substantially parallel to the inner circumferential surface 2c.

The notch portion 21 is a portion in which a corner portion formed by the side surface 2b and the outer circumferential surface 2d is notched and extends over the entire circumferential direction of the body 2. The notch portion 21 is formed by notching a portion of the body 2 on the side surface 2b side and the outer circumferential surface 2d side over the entire circumference by, for example, a jig for cutting, grinding, or polishing. In addition, the notch portion 21 may be formed by plastically processing the above-mentioned portion of the body 2 by rolling, drawing, or the like.

The notch portion 21 has a first surface 21a facing in the direction of the outer circumferential surface 2d side and a second surface 21b facing in the direction of the side surface 2b. The first surface 21a extends substantially parallel to the inner circumferential surface 2c, and the second surface 21b extends substantially parallel to the side surfaces 2a and 2b. Therefore, the angle formed by the first surface 21a and the second surface 21b is substantially a right angle. The corner portion 22 formed by the second surface 21b and the abutment surface 12 of the outer circumferential surface 2d is provided by chamfering. The corner portion 22 may have a rounded shape. In this case, a radius R of curvature of the corner portion 22 may be, for example, around 0.1 mm.

Figure 4:
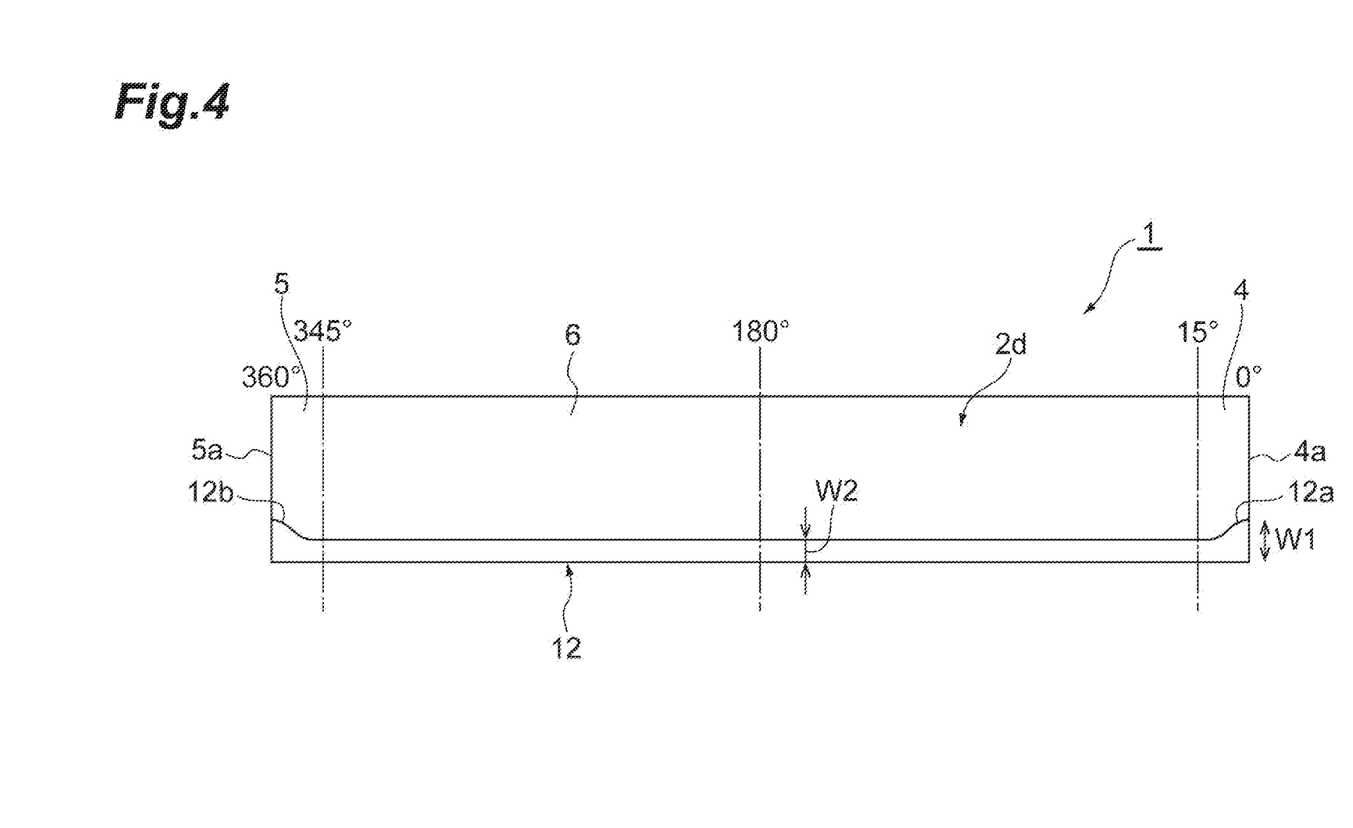
FIG. 4 is a developed view of an outer circumferential surface.

Next, the above-described abutment surface 12 will be described in more detail. FIG. 4 is a developed view of the outer circumferential surface 2d, with the body of the piston ring shown elongated so as to better illustrate the maximum widths W1 and W2 of the abutment surface 12 relative to each other. In FIG. 4, the connection surface and the notch portion of the outer circumferential surface and the corner portion formed by the second surface and the abutment surface are omitted.

As illustrated in FIG. 4, the abutment surface 12 is fortified over the outer circumferential surface 2d from one joint end 4 to the other joint end 5. The abutment surface 12 is formed by performing an outer circumferential lapping process on the end portion 14 (a portion indicated by an imaginary line in FIG. 3) on the side surface 2b side of the inclined surface 11 in FIG. 3. The outer circumferential lapping process is a processing method of forming the abutment surface along the outer circumferential surface of the piston ring by mounting the piston ring on the cylinder having the same diameter as the mounted cylinder and performing lapping in a sleeve having the same inner diameter as the outer diameter (nominal diameter) of the piston ring. The outer circumferential lapping is performed in the final step of manufacturing the piston ring. The self tension per nominal diameter of the piston ring 1 at the time of the outer circumferential lapping is set to, for example, 0.20 N/mm or less.

When the abutment surface 12 is formed by the outer circumferential lapping process, the joint ends 4 and 5, which are free ends, protrude toward the sleeve side, and the machining amount of the joint ends 4 and 5 tends to be larger than the machining amount of the portion excluding the joint ends 4 and 5 (hereinafter referred to as "main portion 6"). This tendency appears stronger as it is closer to the gap faces 4a and 5a. Therefore, as illustrated in FIG. 4, a region 12a in which the width gradually increases toward the gap face 4a of the joint end 4 and a region 12b in which the width gradually increases toward the gap face 5a of the joint end 5 are each formed on the abutment surface 12.

In the example of FIG. 4, when the maximum width of the abutment surface 12 at the joint ends 4 and 5 is W1 and the maximum width of the abutment surface 12 at the main portion 6 is W2, the maximum width W1 is 80% to 150% of the maximum width W2. The abutment surface 12 at the joint ends 4 and 5 has a substantially symmetrical shape with the joint section 3 interposed therebetween. In each of the joint ends 4 and 5, the upper side of the abutment surface 12 is inclined with respect to the lower side substantially parallel to the side surfaces 2a and 2b in the abutment surface 12. Therefore, the width of the abutment surface 12 at the gap faces 4a and 5a is the maximum width W1. In addition, in the abutment surface 12 of the joint ends 4 and 5, the inclined angle of the upper side with respect to the lower side is, for example, 0.05 mm/deg or less. The inclined angle can be obtained by, for example, linearly approximating the upper side of the abutment surface 12 in the joint ends 4 and 5.

The maximum width W2 of the abutment surface 12 in the main portion 6 is 1% to 50% of the width of the body 2. The maximum width W2 is preferably 30% or less of the width of the body 2, and more preferably 20% or less of the width of the body 2. Therefore, in the present embodiment, the maximum width W2 is set to be, for example, 0.005 mm to 0.5 mm. The maximum width W1 is set to be 0.004 mm to 0.75 mm.

The maximum widths W1 and W2 are the initial values of the maximum width of the abutment surface 12 formed by the outer circumferential lapping process and refer to the widths before the change due to wear. In addition, in a state in which the piston ring 1 is mounted on the cylinder having the same diameter as the actually mounted cylinder, when the central position of the joint section 3 is set to be 0° (or 360°) (see FIG. 2), the abutment surface 12 (region 12a) at the joint end 4 refers to the portion positioned in the range of 0° to 15°, and the abutment surface 12 (region 12b) at the joint end 5 refers to the portion positioned in the range of 345° to 360°. The abutment surface 12 in the main portion 6 refers to a portion positioned in the range greater than 15° and less than 345°. The central position of the joint section 3 is an intermediate position between the joint ends 4 and 5 when the side surface 2b of the body 2 is placed on a flat surface. A distance between the joint ends 4 and 5 at this time is the same as a distance between the joint ends 4 and 5 when the piston ring 1 is accommodated in a housing (ring gauge) having the same size as the nominal diameter thereof at room temperature.

A portion positioned on the opposite side of the joint ends 4 and 5 in the body 2 (for example, a portion positioned in the range of 150° to 210° in the main portion 6) is a portion that is difficult to protrude toward the sleeve as compared with the joint ends 4 and 5 when the piston ring 1 is mounted on the cylinder, and is difficult to be subjected to the outer circumferential lapping process. Therefore, the width of the abutment surface 12 in the portion positioned on the opposite side of the joint ends 4 and 5 tends to be smallest over the entire abutment surface 12. Therefore, when the maximum width of the abutment surface 12 of the portion where the width of the abutment surface 12 tends to be smallest is the reference, the maximum width W1 of the joint ends 4 and 5 is preferably 80% to 150% of the maximum width of the abutment surface 12 in the portion positioned on the opposite side of the joint ends 4 and 5.

In the piston ring 1 having the above-described configuration, the maximum width W1 of the abutment surface 12 of the joint ends 4 and 5 is 150% or less of the maximum width W2 of the abutment surface 12 in the main portion 6. When this range is satisfied, the variation in the width of the abutment surface 12 in accordance with a portion of the body 2 is suppressed. Therefore, it is possible to suppress an increase in oil consumption due to the reduction in surface pressure and an increase in frictional loss due to the effects of wear. In addition, in the piston ring 1, the two-axis difference (d2−d1) is less than +0.36 mm. Therefore, when the outer circumferential lapping process is performed, the joint ends 4 and 5 are restricted from protruding toward the sleeve side by self tension, and the machining accuracy of the abutment surface 12 can be sufficiently ensured. Thus, the abutment surface 12 satisfying the above range can be formed with high yield. Furthermore, in the piston ring 1, the two-axis difference (d2−d1) is greater than −0.25 mm. Therefore, even when the back pressure is small, it is possible to sufficiently provide the sealability by the outer circumferential surface 2d.

When the central position of the joint section 3 is set to be 0° and the position of the body 2 is represented by an angle, the abutment surface 12 at the joint end 4 is a portion positioned in the range of 0° to 15°, the abutment surface 12 at the joint end 5 is a portion positioned in the range of 345° to 360°, and the abutment surface 12 of the main portion 6 is a portion positioned in the range greater than 15° and less than 345°. When the joint ends 4 and 5 are positioned in the above range and the relationship of the maximum width of the abutment surface 12 is satisfied, it is possible to effectively suppress an increase in oil consumption due to the reduction in surface pressure and an increase in frictional loss due to the effects of wear.

The maximum width W1 is preferably 80% to 150% of the maximum width of the abutment surface 12 in the range of 150° to 210° in the main portion 6. When the maximum width W1 satisfies the above range with respect to the maximum width of the range where the width tends to become smallest in the abutment surface 12 of the main portion 6, the variation in the width of the abutment surface 12 by the portion of the body 2 is more preferably suppressed.

Since the maximum width W2 of the abutment surface 12 of the main portion 6 is 1% of 50% of the width of the body 2, the piston ring 1 can suitably form an oil film on the inner wall of the cylinder, and suppress scraping up of the oil into the combustion chamber by the abutment surface 12. In addition, an increase in the frictional loss due to the abutment surface 12 can be avoided.

Figure 5:
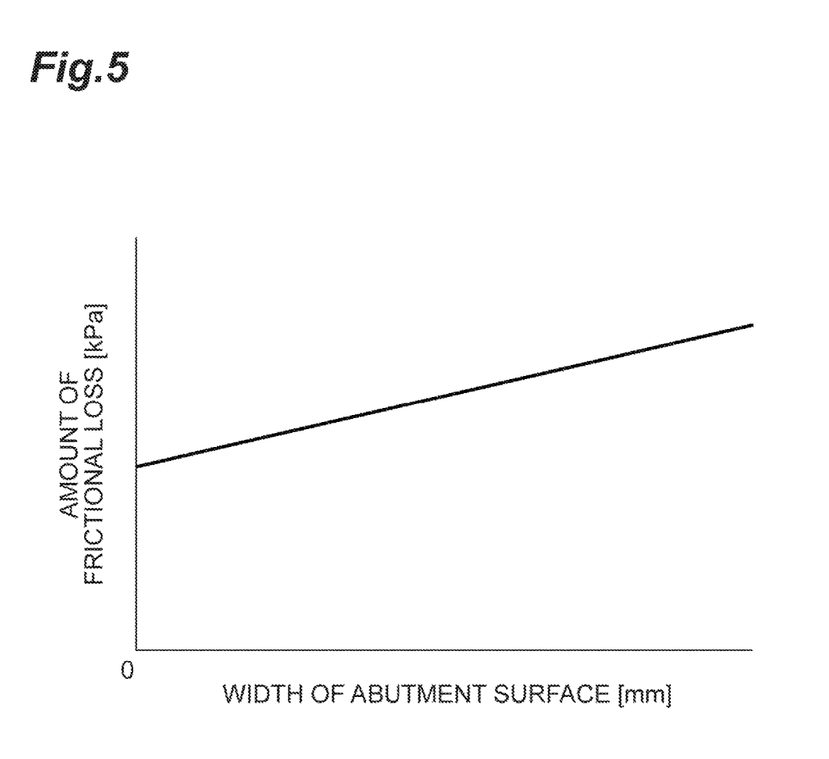
FIG. 5 is a graph showing a relationship between a width of an abutment surface of the piston ring and an amount of frictional loss.

FIG. 5 is a graph showing an example of a relationship between the width of the abutment surface of the piston ring and the frictional loss. In FIG. 5, the vertical axis represents the amount of initial frictional loss and the horizontal axis represents the width of the abutment surface. As illustrated in FIG. 5, it can be seen that as the width of the abutment surface increases, the amount of frictional loss tends to increase. Therefore, the maximum width W2 of the abutment surface 12 of the main portion 6 is set to be 0.005 mm to 0.5 mm (that is, the maximum width W2 is set to be 1% to 50% of the width of the body 2), thereby suitably suppressing the initial frictional loss due to the piston ring 1.

In the body 2, the notch portion 21 extends in the circumferential direction of the body 2 at the corner portion formed by the side surface 2b and the outer circumferential surface 2d. In this case, the oil scraped off by the piston ring 1 can flow into the notch portion 21.

By using the piston ring 1 as the second ring, it is possible to sufficiently provide the sealability by the outer circumferential surface 2d even when the back pressure is small.

Next, a modification of the above embodiment will be described.

Figure 6:
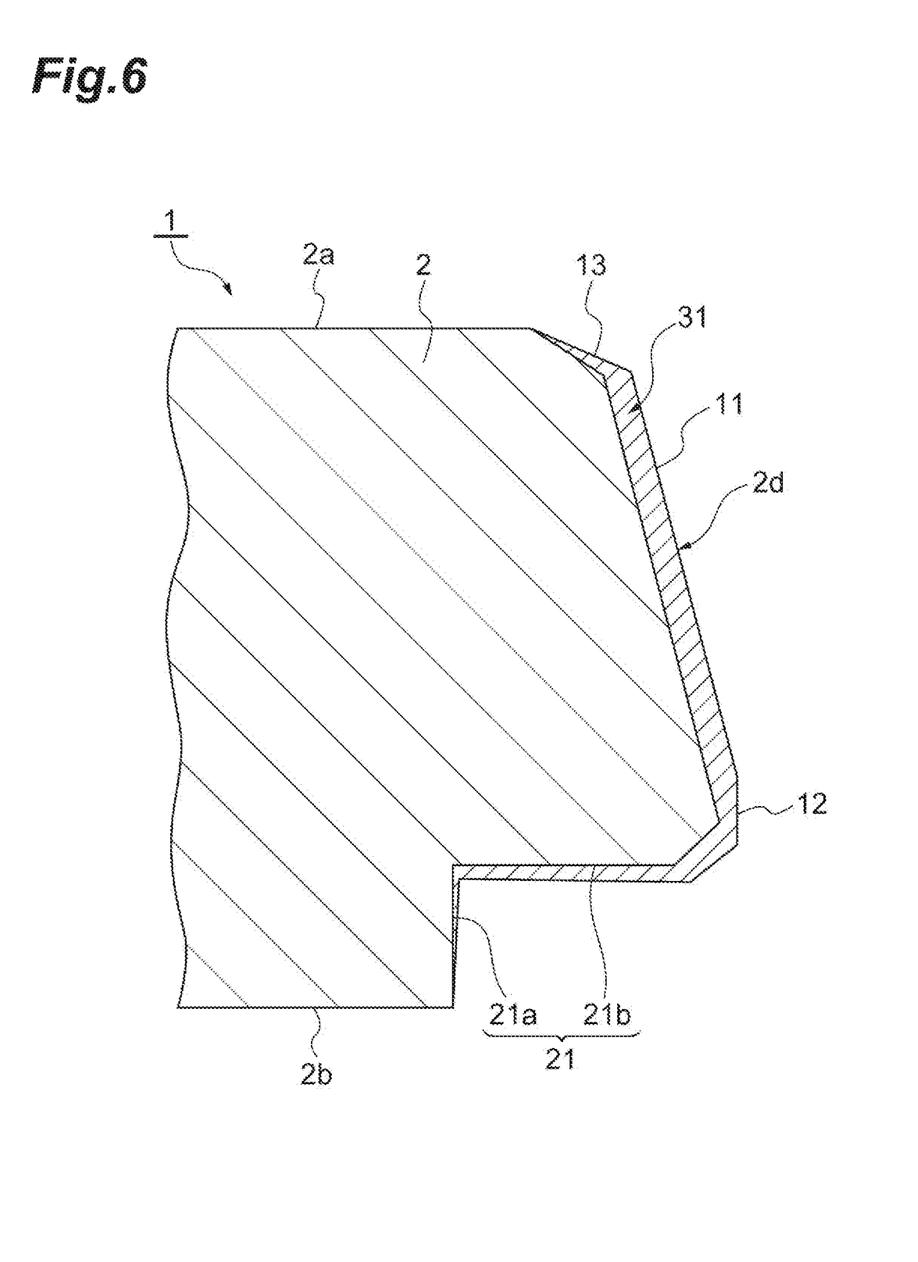
FIG. 6 is a cross-sectional view of a body of a piston ring according to a modification of the embodiment.

For example, in the above embodiment illustrated in FIG. 6, although the second ring in which a protective film or the like is not formed on the outer circumferential surface 2d is illustrated, a hard film 31 having higher hardness than the body 2 may extend over the entire circumferential direction of the body 2 as the outermost surface of the outer circumferential surface 2d of the body 2. In the present modification, after the corner portion formed by the side surface 2a and the outer circumferential surface 2d is chamfered and the corner portion formed by the side surface 2b and the outer circumferential surface 2d is notched, the hard film 31 as the outermost surface of the outer circumferential surface 2d is formed. Then, the inclined surface 11, the connection surface 13, and the notch portion 21 therefrom are formed. Then, the abutment surface 12 is formed by performing the outer circumferential lapping process on the end portion of the inclined surface 11 formed by the hard film 31 on the side surface 2b side. It should be noted that the corner portion formed in the piston ring 1 by chamfering or the like may have a rounded shape.

The hard film 31 is a physical vapor deposition film (PVD film) formed by physical vapor deposition (PVD). Therefore, the hard film 31 can be formed with sufficient hardness. The hardness of the hard film 31 is, for example, 800 HV0.05 to 2000 HV0.05 in terms of Vickers hardness, which is about two times higher than the hardness of the body 2. The hard film 31 is an ion plating film containing at least one of titanium (Ti) and chromium (Cr) and at least one of carbon (C), nitrogen (N), and oxygen, or a diamond-like carbon film. As a specific example, the hard film 31 is a titanium nitride film, a chromium nitride film, a titanium carbonitride film, a chromium carbonitride film, a chromium oxynitride film, a chromium film, or a titanium film. Among them, in a case where wear resistance and scuffing resistance are emphasized, it is preferable to use a chromium nitride film. The hard film 31 may be a laminated body and may include, for example, a chromium nitride film, a diamond-like carbon film, or the like.

The effects of wear of the abutment surface 12 can be suppressed by using the hard film 31 as the outermost surface of the outer circumferential surface 2d as described above. In addition, in the outer circumferential lapping process, the difference between the maximum width W1 of the abutment surface at the joint end 4 and the maximum width W2 of the abutment surface 12 in the main portion 6 can be reduced, and the abutment surface 12 in which the maximum width W1 is 80% to 150% of the maximum width W2 can be formed with even better yield.

The thickness of the hard film 31 along the radial direction of the body 2 is 1 μm to 30 μm. Therefore, the thickness of the hard film 31 becomes sufficient and the effects of wear on the abutment surface 12 can be suppressed. In order to improve the adhesion between the body 2 and the hard film 31, an undercoat such as a chromium film or a titanium film may be applied to the body 2.

One aspect of the present invention is not limited to the above embodiment and the above modification. For example, the notch portion 21 is notched in a cross-section step shape, but the notch portion 21 may be notched in a cross-sectional hook shape.

In the embodiment and the modification described above, the abutment surface is provided on the side surface 2b side from the center in the width direction of the body 2, but may be provided on the side surface 2a side from the center.

The piston rings according to the embodiment and the modification can be used as, for example, a top ring or a third ring in a diesel engine, in addition to the second ring.

In the embodiment and the modification described above, the right-angle joint in which the gap face 4a of the joint end 4 and the gap face 5a of the joint end 5 are formed perpendicularly to the circumferential direction of the body 2 is exemplified, but the shape of the joint end is not limited thereto. For example, it may be an inclined joint in which the gap faces 4a and 5a are formed to be inclined with respect to the circumferential direction, and it may be a stepped joint in which the side surface 2a side of the gap face 4a and the side surface 2b side of the gap face 5a protrude toward each other.

EXAMPLES

The present invention will be described in more detail by the following examples, but the present invention is not limited to these examples.

Example 1

A second ring of Example 1 was produced by the following procedure. First, a ring including a body having an inclined surface on an outer circumferential surface was produced. As the ring body, a silicon chrome steel oil tempered wire (SWOSC-V), which is the JIS standard, was used as a wire material, and the wire material was subjected to rolling molding and pultrusion molding. The nominal diameter of the body was set to be 80 mm. In addition, the width of the body was set to be 1.2 mm, and the thickness of the body was set to be 3.0 mm. The radius of curvature of the corner portion of the lower end of the inclined surface was 0.1 mm.

Next, after performing side surface processing and joint processing on the body, the outer circumferential lapping was performed by using a true circle sleeve having an inner diameter of 80 mm. In Example 1, the processing condition was adjusted such that the abutment width was 0.1 mm (about 8% of the width of the body 2) over the entire circumference of the body by the outer circumferential lapping process. In addition, zinc phosphate processing was performed as surface processing on the entire surface of the body.

In the production of the second ring, the two-axis difference (d2−d1) between the diameter d1 of the body along the first axis direction and the diameter d2 of the body along the second axis direction was adjusted to the values shown in Table 1 below. In addition, in the body, the maximum width W1 of the joint end and the maximum width W2 of the main portion were adjusted to the values shown in Table 1 below. In Table 1 below, a ratio (W1/W2) of the maximum width W1 of the joint end to the maximum width W2 of the main portion is also shown.

Examples 2, 4 to 7, 10, 12 to 14, and 16

Second rings of Examples were produced in the same procedure as in Example 1. The specifications of the second rings (the two-axis difference, the maximum width of each of the joint ends, and the maximum width W2 with respect to the main portion) are shown in Table 1 below.

Examples 3, 8, 9, 11, 15, and 17 to 19

Second rings were produced in the same manner as in Example 1, except for the matters described below. The specifications of the second rings in these Examples are shown in Table 1 below.

In Examples 3, 8, 9, 11, 15, and 17 to 19, a chromium nitride film (CrN film) was formed as a hard film on the outer circumferential surface of the body by a PVD method after the above-mentioned joint processing. The thickness of the chromium nitride film was set to be 15 μm. After the chromium nitride film was formed, an outer circumferential lapping process was performed in the same manner as in Example 1 and the like. Therefore, an abutment surface was formed over the entire circumference of the body in the chromium nitride film that is a hard film.

Comparative Examples 1 to 3, 5, 6, 8, 10, 13, and 14

Second rings of Comparative Examples were produced in the same procedure as in Example 1. The specifications of the second rings are shown in Table 1 below.

Comparative Examples 4, 7, 9, 11, and 12

Second rings having the hard film according to Comparative Examples were produced in the same procedure as in Example 3. The specifications of the second rings are shown in Table 1 below.

(Validation of Oil Consumption)

The second ring of each Example and each Comparative Example was mounted on a second ring groove of a piston in an inline four-cylinder gasoline engine with a displacement of 2.4 L. Then, when the gasoline engine was operated for a predetermined time under the condition of the rotational speed of 6800 rpm (6800 min$^{-1}$) and the full load (WOT: wide open throttle), the measurement of oil consumption (LOC: low oil consumption) was performed for each Example and each Comparative Example. In each Example and each Comparative Example, a common ring was used for a top ring and an oil ring. The oil consumptions were calculated by measuring each of the amount of oil stored before the operation of the gasoline engine and the amount of oil stored after the operation of the gasoline engine. Assuming that the amount of oil consumption of Comparative Example 1 is 100%, the ratios (%) of the amounts of oil consumption in each Example and Comparative Examples 2 to 14 are shown in Table 1.

(Frictional Loss Measurement Test)

Figure 7:
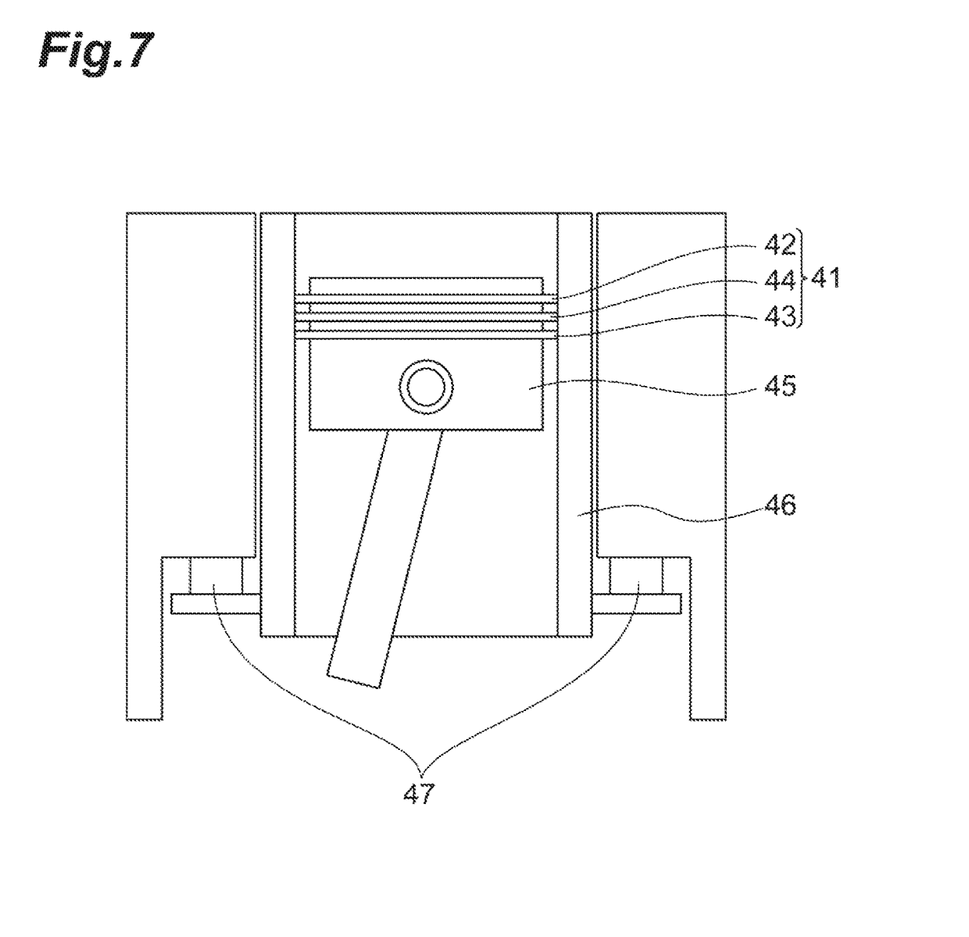
FIG. 7 is a view for describing a frictional loss test.

As illustrated in FIG. 7, a piston ring set 41 including a top ring 42 and an oil ring 43 and a second ring 44 of each Example and each Comparative Example was prepared. The piston ring set 41 was mounted on a piston 45 of a floating liner type friction measurement engine, and the frictional loss of each second ring 44 was evaluated using friction mean effective pressure (FMEP). A cylinder liner 46 made of cast iron was used as a mating material sliding with the top ring 42, the second ring 44, and the oil ring 43. A ten-point average roughness (Rz) of the cylinder liner 46 was set to be 2 μm to 4 μm. In addition, a load measurement sensor 47 was attached to the outer periphery of the cylinder liner 46. A tension of the top ring 42 was set to be 3 N, a tension of the second ring 44 was set to be 2 N, and a tension of the oil ring 43 was set to be 15 N.

In the frictional loss measurement test, the frictional force (frictional loss) applied at a time when the top ring 42, the second ring 44, and the oil ring 43 slid vertically on the cylinder liner 46 in accordance with the operation of the piston 45 was measured by the load measurement sensor 47. This frictional loss is the total frictional force of the top ring 42, the second ring 44, and the oil ring 43. In the frictional force measurement test, the engine speed was 2000 rpm, the engine load was 15 N·m, and the lubricating oil temperature was 87° C. In addition, the test time for the frictional force measurement was set to be 10 hours. Assuming that FMEP of Comparative Example 1 is 100%, the ratios (%) of FMEPs between each Example and Comparative Examples 2 to 14 are shown in Table 1.

TABLE 1

| | Body width mm | Two-axis difference mm | Maximum width of butt end 4 mm | Maximum width of butt end 5 mm | Maximum width W1 of butt end mm | Maximum width W2 of main portion 6 mm | W1/W2 % | Hard film (CrN) | LOC % | FMEP % |
|---|---|---|---|---|---|---|---|---|---|---|
| Example 1 | 1.2 | −0.05 | 0.211 | 0.189 | 0.211 | 0.207 | 101.9 | Absent | 95 | 77 |
| Example 2 | 1.2 | −0.11 | 0.241 | 0.230 | 0.241 | 0.246 | 98.0 | Absent | 98 | 79 |
| Example 3 | 1.2 | 0.13 | 0.217 | 0.182 | 0.217 | 0.195 | 111.3 | Present | 80 | 82 |
| Example 4 | 1.2 | 0.31 | 0.206 | 0.191 | 0.206 | 0.197 | 104.6 | Absent | 92 | 84 |
| Example 5 | 1.2 | 0.15 | 0.237 | 0.225 | 0.237 | 0.202 | 117.3 | Absent | 84 | 88 |
| Example 6 | 1.2 | −0.08 | 0.217 | 0.225 | 0.225 | 0.230 | 97.8 | Absent | 92 | 80 |
| Example 7 | 1.2 | 0.25 | 0.220 | 0.218 | 0.220 | 0.215 | 102.3 | Absent | 90 | 85 |
| Example 8 | 1.2 | 0.2 | 0.197 | 0.232 | 0.232 | 0.172 | 134.9 | Present | 78 | 90 |
| Example 9 | 1.2 | 0.1 | 0.182 | 0.183 | 0.183 | 0.181 | 101.1 | Present | 90 | 87 |
| Example 10 | 1.2 | −0.05 | 0.174 | 0.195 | 0.195 | 0.185 | 105.4 | Absent | 92 | 84 |
| Example 11 | 1.2 | 0.15 | 0.227 | 0.230 | 0.230 | 0.169 | 136.1 | Present | 76 | 95 |
| Example 12 | 1.2 | 0.14 | 0.243 | 0.244 | 0.244 | 0.222 | 109.9 | Absent | 92 | 88 |
| Example 13 | 1.2 | 0.2 | 0.202 | 0.224 | 0.224 | 0.182 | 123.1 | Absent | 88 | 90 |
| Example 14 | 1.2 | 0.05 | 0.259 | 0.211 | 0.259 | 0.212 | 122.2 | Absent | 89 | 89 |
| Example 15 | 1.2 | 0.25 | 0.193 | 0.248 | 0.248 | 0.217 | 114.3 | Present | 90 | 83 |
| Example 16 | 1.2 | 0.3 | 0.207 | 0.176 | 0.207 | 0.210 | 98.6 | Absent | 91 | 80 |

TABLE 1-continued

| | Body width mm | Two-axis difference mm | Maximum width of butt end 4 mm | Maximum width of butt end 5 mm | Maximum width W1 of butt end mm | Maximum width W2 of main portion 6 mm | W1/W2 % | Hard film (CrN) | LOC % | FMEP % |
|---|---|---|---|---|---|---|---|---|---|---|
| Example 17 | 1.2 | 0.3 | 0.221 | 0.205 | 0.221 | 0.159 | 139.0 | Present | 80 | 93 |
| Example 18 | 1.2 | −0.2 | 0.380 | 0.350 | 0.380 | 0.280 | 135.7 | Present | 98 | 94 |
| Example 19 | 1.2 | −0.23 | 0.280 | 0.260 | 0.280 | 0.240 | 116.7 | Present | 99 | 93 |
| Comparative Example 1 | 1.2 | −0.15 | 0.286 | 0.288 | 0.288 | 0.172 | 167.4 | Absent | 100 | 100 |
| Comparative Example 2 | 1.2 | 0.45 | 0.315 | 0.372 | 0.372 | 0.193 | 192.7 | Absent | 95 | 128 |
| Comparative Example 3 | 1.2 | 0.5 | 0.385 | 0.363 | 0.385 | 0.230 | 167.4 | Absent | 90 | 115 |
| Comparative Example 4 | 1.2 | −0.25 | 0.198 | 0.165 | 0.198 | 0.216 | 91.7 | Present | 118 | 86 |
| Comparative Example 5 | 1.2 | 0.4 | 0.333 | 0.353 | 0.353 | 0.181 | 195.0 | Absent | 76 | 120 |
| Comparative Example 6 | 1.2 | −0.3 | 0.125 | 0.144 | 0.144 | 0.179 | 80.4 | Absent | 154 | 80 |
| Comparative Example 7 | 1.2 | −0.45 | 0.112 | 0.128 | 0.128 | 0.245 | 52.2 | Present | 150 | 77 |
| Comparative Example 8 | 1.2 | 0.35 | 0.318 | 0.332 | 0.332 | 0.181 | 183.4 | Absent | 80 | 110 |
| Comparative Example 9 | 1.2 | 0.38 | 0.399 | 0.402 | 0.402 | 0.209 | 192.3 | Present | 65 | 135 |
| Comparative Example 10 | 1.2 | 0.4 | 0.325 | 0.312 | 0.325 | 0.231 | 140.7 | Absent | 92 | 105 |
| Comparative Example 11 | 1.2 | 0.15 | 0.318 | 0.332 | 0.332 | 0.211 | 157.3 | Present | 85 | 115 |
| Comparative Example 12 | 1.2 | −0.28 | 0.480 | 0.490 | 0.490 | 0.315 | 155.6 | Present | 120 | 97 |
| Comparative Example 13 | 1.2 | −0.25 | 0.230 | 0.220 | 0.230 | 0.300 | 76.7 | Absent | 112 | 90 |
| Comparative Example 14 | 1.2 | 0.36 | 0.480 | 0.490 | 0.490 | 0.350 | 140.0 | Absent | 95 | 103 |

From Table 1 above, in each of Examples 1 to 19, both LOC and FMEP were reduced as compared with Comparative Example 1. On the other hand, in Comparative Examples 2, 3, 5, 8 to 11, and 14, LOC was lower than that in Comparative Example 1, but FMEP was higher than that in Comparative Example 1. In addition, in Comparative Examples 4, 6, 7, 12, and 13, although FMEP was decreased as compared with Comparative Example 1, LOC was higher than that in Comparative Example 1.

For example, in Example 4 in which the two-axis difference was around the upper limit of the present invention (+0.31 mm), both LOC and FMEP were lower than those in Comparative Example 1. In contrast, in Comparative Example 14 in which the two-axis difference exceeded the upper limit (+0.36 mm) of the present invention, LOC was lower than that in Comparative Example 1, but FMEP was increased as compared with Comparative Example 1. From these results, it was demonstrated that both LOC and FMEP could be reduced by setting the two-axis difference to be less than +0.36 mm and setting W1/W2 to be 80% to 150%.

For example, in Example 19 in which the two-axis difference was around the lower limit of the present invention (−0.23 mm), both LOC and FMEP were lower than those in Comparative Example 1. In contrast, in Comparative Example 4 in which the two-axis difference exceeded the lower limit (−0.25 mm) of the present invention, FMEP was lower than that in Comparative Example 1, but LOC was increased as compared with Comparative Example 1. In addition, in Comparative Example 13 in which the two-axis difference exceeded the lower limit (−0.25 mm) of the present invention and W1/W2 was out of the range of 80% to 150% (76.7%), FMEP was lower than that in Comparative Example 1, but LOC was increased as compared with Comparative Example 1. From these results, it was demonstrated that both LOC and FMEP could be reduced by setting the two-axis difference to be greater than −0.25 mm and setting W1/W2 to be 80% to 150%.

From the above results, it was demonstrated that both LOC and FMEP could be reduced when the two-axis difference was greater than −0.25 mm and less than +0.36 mm and W1/W2 was within the above range, regardless of the presence or absence of the hard film.

REFERENCE SIGNS LIST

1 . . . piston ring, 2 . . . body, 2a, 2b . . . side surface, 2c . . . inner circumferential surface, 2d . . . outer circumferential surface, 4, 5 . . . joint end, 6 . . . main portion, 11 . . . inclined surface, 12 . . . abutment surface, 21 . . . notch portion, d1, d2 . . . diameter

The invention claimed is:

1. A piston ring having an annular body comprising:
an inner circumferential surface and an outer circumferential surface;
a first side surface and a second side surface substantially orthogonal to the inner circumferential surface; and
a pair of joint ends positioned opposite to each other to form a joint section,
wherein the outer circumferential surface comprises:
an inclined surface inclined so as to protrude in a radial direction of the body from a first side of the body including the first side surface to a second side of the body including the second side surface; and
an abutment surface provided toward the second side of the body from the inclined surface, the abutment surface extending substantially parallel to the inner circumferential surface,
wherein, in a direction connecting the first side surface and the second side surface, a maximum width W1 of the abutment surface at each of the joint ends is 80% to 150% of a maximum width W2 of the abutment surface in a portion other than the joint ends, and
wherein, in the body, a two-axis difference (d2−d1) between a diameter d1 in a first axis direction passing through a central position of the joint section and a diameter d2 in a second axis direction orthogonal to the first axis direction is greater than −0.25 atm and less than +0.36 mm.

2. The piston ring according to claim 1, wherein a hard film having a hardness higher than that of the body extends in a circumferential direction of the body as an outermost surface of the outer circumferential surface.

3. The piston ring according to claim 2, wherein the hard film is a physical vapor deposition film.

4. The piston ring according to claim 3, wherein the hard film comprises at least one film selected from the group consisting of a titanium nitride film, a chromium nitride film, a titanium carbonitride film, a chromium carbonitride film, a chromium film, a titanium film, and a diamond-like carbon film.

5. The piston ring according to claim 4, wherein a thickness of the hard film is 1 μm to 30 μm.

6. The piston ring according to claim 5, wherein, when the central position of the joint section is set to be 0°, the pair of joint ends comprises a first joint end and a second joint end positioned opposite the first joint end, and an angular position of the joint ends is determined in a circumferential direction of the body with respect to the central position of the joint section, an abutment surface at the first joint end is angularly positioned in a range of 0° to 15° from the central position in the circumferential direction, and an abutment surface at the second joint end is angularly positioned in a range of 345° to 360° from the central position in the circumferential direction.

7. The piston ring according to claim 6, wherein the maximum width W1 is 80% to 150% of the maximum width of the abutment surface in a range of 150° to 210° in the portion other than the joint ends.

8. The piston ring according to claim 7, wherein the maximum width W2 is 1% to 50% of a width of the body.

9. The piston ring according to claim 8, wherein the maximum width W2 is 0.005 mm to 0.5 mm.

10. The piston ring according to claim 9, wherein, in the body, a notch portion extends in the circumferential direction of the body at a corner portion formed by the second side surface and the outer circumferential surface.

11. The piston ring according to 10, wherein the piston ring is a second ring.

12. The piston ring according to claim 1, wherein the piston ring is a second ring.

13. The piston ring according to claim 2, wherein the hard film comprises at least one film selected from the group consisting of a titanium nitride film, a chromium nitride film, a titanium carbonitride film, a chromium carbonitride film, a chromium film, a titanium film, and a diamond-like carbon film.

14. The piston ring according to claim 13, wherein a thickness of the hard film is 1 μm to 30 μm.

15. The piston ring according to claim 2, wherein a thickness of the hard film is 1 μm to 30 μm.

16. The piston ring according to claim 1, wherein, when the central position of the joint section is set to be 0°, the pair of joint ends comprises a first joint end and a second joint end positioned opposite the first joint end, and an angular position of the joint ends is determined in a circumferential direction of the body with respect to the central position of the joint section, an abutment surface at the first joint end is angularly positioned in a range of 0° to 15° from the central position in the circumferential direction, and an abutment surface at the second joint end is angularly positioned in a range of 345° to 360° from the central position in the circumferential direction.

17. The piston ring according to claim 16, wherein the maximum width W1 is 80% to 150% of the maximum width of the abutment surface in a range of 150° to 210° in the portion other than the joint ends.

18. The piston ring according to claim 1, wherein the maximum width W2 is 1% to 50% of a width of the body.

19. The piston ring according to claim 1, wherein the maximum width W2 is 0.005 mm to 0.5 mm.

20. The piston ring according to claim 1, wherein, in the body, a notch portion extends in the circumferential direction of the body at a corner portion formed by the second side surface and the outer circumferential surface.

* * * * *